US012301338B2

(12) United States Patent
Yang (10) Patent No.: US 12,301,338 B2
(45) Date of Patent: May 13, 2025

(54) TIME SYNCHRONIZATION METHOD, ELECTRONIC DEVICE, AND STORAGE MEDIUM (71) Applicant: BEIJING CHJ INFORMATION TECHNOLOGY CO., LTD., Beijing (CN)

(72) Inventor: Shaodong Yang, Beijing (CN)

(73) Assignee: Beijing CHJ Information Technology Co., LTD., Beijing (CN)

( * ) Notice: Subject to any disclaimer, the term of this patent is extended or adjusted under 35 U.S.C. 154(b) by 0 days.

(21) Appl. No.: 18/689,469

(22) PCT Filed: Sep. 5, 2022

(86) PCT No.: PCT/CN2022/117111
§ 371 (c)(1),
(2) Date: Mar. 6, 2024

(87) PCT Pub. No.: WO2023/030525
PCT Pub. Date: Mar. 9, 2023

(65) Prior Publication Data
US 2024/0267143 A1 Aug. 8, 2024

(30) Foreign Application Priority Data
Sep. 6, 2021 (CN) .......................... 202111040030.1

(51) Int. Cl.
H04J 3/06 (2006.01)
(52) U.S. Cl.
CPC ................................ H04J 3/0658 (2013.01)

(58) Field of Classification Search
CPC ...... H04J 3/0658; H04J 3/0661; H04J 3/0667; H04J 3/0641; H04J 3/0644; H04J 3/0638;
(Continued)

(56) References Cited

U.S. PATENT DOCUMENTS 5,822,571 A    10/1998  Goodrum et al.
2009/0006894 A1  1/2009  Bellofatto et al.
(Continued)

FOREIGN PATENT DOCUMENTS

CN    1925386 A    3/2007
CN    103763055 A   4/2014
(Continued)

OTHER PUBLICATIONS

International Search Report for corresponding PCT/CN2022/117111, mailed Oct. 25, 2022, 28 pages (English translation).
(Continued)

Primary Examiner — Peter Chen
(74) Attorney, Agent, or Firm — Maginot, Moore & Beck, LLP (57) ABSTRACT A method for time synchronization, includes: acquiring target information including preset mode information; determining a target mode according to the preset mode information; determining a first synchronous clock as a clock source, in the target mode; and generating a first control instruction for controlling a device waiting for the time synchronization to perform the time synchronization according to the first synchronous clock.

8 Claims, 4 Drawing Sheets (58) Field of Classification Search
CPC ...... H04J 3/0635; H04J 3/0685; H04J 3/0688; H04J 3/0697; H04W 56/00; H04W 56/001; H04W 56/0015; H04W 56/002; H04W 56/0025; H04L 67/12; H04L 67/125; H04L 7/0037; H04L 2012/40215; H04L 43/106

See application file for complete search history.

(56) References Cited

U.S. PATENT DOCUMENTS

| | | | |
|---|---|---|---|
| 2009/0022065 | A1 | 1/2009 | Chen et al. |
| 2012/0069943 | A1 | 3/2012 | Lim et al. |
| 2014/0211782 | A1* | 7/2014 | Yamaguchi ....... H04W 56/0025 370/350 |
| 2020/0274690 | A1 | 8/2020 | Tanaka |
| 2021/0273736 | A1* | 9/2021 | Li ......................... H04W 76/12 |
| 2024/0031123 | A1* | 1/2024 | Kitagawa ................ H04L 67/12 |

FOREIGN PATENT DOCUMENTS

| | | |
|---|---|---|
| CN | 104145435 A | 11/2014 |
| CN | 106130679 A | 11/2016 |
| CN | 106879063 A | 6/2017 |
| CN | 107710745 A | 2/2018 |
| CN | 107786293 A | 3/2018 |
| CN | 109996326 A | 7/2019 |
| CN | 111130676 A | 5/2020 |
| CN | 111464402 A | 7/2020 |
| CN | 111669245 A | 9/2020 |
| CN | 112713951 A | 4/2021 |
| CN | 112929122 A | 6/2021 |
| CN | 113068250 A | 7/2021 |
| CN | 113225152 A | 8/2021 |
| CN | 113273105 A | 8/2021 |
| CN | 113821074 A | 12/2021 |
| EP | 2738971 A1 | 6/2014 |
| EP | 3016306 B1 | 7/2021 |

OTHER PUBLICATIONS

Office Action for corresponding CN202111040030.1, mailed Apr. 27, 2021, 14 pages (English translation).

Quan, Yu-juan, et al., Compensation of Local Clock Drifting for Time Synchronization by Timestamp Streams, Journal of Inner Mongolia University, Mar. 2008, pp. 191-195, vol. 39, No. 2, China Academic Journal Electronic Publishing House, China (English translation).

Notice of Allowance for corresponding CN202111040030.1, mailed Aug. 16, 2023, 5 pages (English Translation).

Search Report for corresponding EP application 22863659.3, mailed Nov. 13, 2024. (9 pages).

* cited by examiner

TIME SYNCHRONIZATION METHOD, ELECTRONIC DEVICE, AND STORAGE MEDIUM

CROSS-REFERENCE TO RELATED APPLICATION

This application is a national phase of International Application No. PCT/CN2022/117111 filed on Sep. 5, 2022, which claims priority to Chinese Patent Application No. 202111040030.1, filed on Sep. 6, 2021 in the China National Intellectual Property Administration, the entire content of which is incorporated herein by reference.

TECHNICAL FIELD

The disclosure relates to the field of data processing technologies, and specifically to a method for time synchronization, an electronic device, and a storage medium.

BACKGROUND

At present, intelligent control for vehicles is widely applied. In actual applications of the vehicle, due to various emergency situations, the time of the vehicle terminal is inaccurate or the time of each device controlled by the terminal is different. For example, after the vehicle terminal is powered off and when the vehicle is powered on again without a network, the time of the vehicle terminal may be wrong, so that a plurality of electronic devices may not be accurately controlled by the terminal. Therefore, time synchronization requires to be performed on the vehicle, so as to achieve accurate control for the vehicle.

However, in an existing standard time synchronization system, steps of waiting for all devices to be synchronized to transmit messages, selecting an optimal clock, waiting for time synchronization, and performing the time synchronization are required. Step of waiting for many times causes slow time synchronization, a large amount of time consumed, and low efficiency. The standard time synchronization system is not applicable to the vehicle and is not compatible in the vehicle field. When the time synchronization is performed in the vehicle field, steps of waiting for the time synchronization and performing the time synchronization are only required. Step of waiting causes a slow time synchronization speed and a long period of time for the time synchronization.

SUMMARY

According to a first aspect, a method for time synchronization is provided according to embodiments of the disclosure and includes: acquiring target information including preset mode information; determining a target mode according to the preset mode information; determining a first synchronous clock as a clock source, in the target mode; and generating a first control instruction for controlling a device waiting for the time synchronization to perform the time synchronization according to the first synchronous clock.

According to a second aspect, an electronic device is provided according to embodiments of the disclosure and includes: a memory; a processor; and a computer program stored in the memory, in which the computer program is configured to be executed by the processor to perform the method for time synchronization.

According to a third aspect, a computer-readable storage medium with a computer program stored thereon is provided according to embodiments of the disclosure. When the computer program is executed by a processor, steps of the method for time synchronization are performed.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

To explain the technical solutions according to embodiments of the disclosure or in the related art more clearly, the drawings described according to the embodiments or in the related art will be briefly introduced below. Obviously, those skilled in the art may obtain other drawings according to the drawings without any creative work.

DETAILED DESCRIPTION

To understand the above purpose, features, and advantages according to the disclosure more clearly, embodiments of the disclosure may be further described below. It should be noted that, embodiments of the disclosure may be combined with features in the embodiments without conflict.

Numerous specific details are set forth in the following description to facilitate a thorough understanding of the disclosure. However, the disclosure may also be implemented in other different ways than those described herein; obviously, embodiments in the specification are only a part of embodiments of the disclosure rather than all embodiments.

In detail, a standard time synchronization system based on a time-sensitive networking protocol (such as 802.1AS protocol) requires four steps of waiting for messages, determining a master clock, waiting for time synchronization, and performing time synchronization according to the master clock. Two steps of waiting for the messages and waiting for the time synchronization are required, which consumes a large amount of time and has low processing efficiency; second, the vehicle field does not support the best master clock algorithm (BMCA) for determining the master clock, i.e. does not support step of determining the master clock. In the vehicle field, devices in a vehicle have been configured to take corresponding functions. The devices may be configured as a master or a slave in advance, and time of the master is usually taken as the master clock. Therefore, in the vehicle field, the BMCA is not supported to determine the master clock or the slave clock, and the standard time synchronization system in the time-sensitive networking protocol is not applicable in the vehicle field. Therefore, when the time synchronization is performed in the vehicle field, only two steps of waiting for the time synchronization and performing the time synchronization according to the master clock are required. Although steps of waiting for the messages and determining the master clock are not required, waiting for the time synchronization remains to be required, which consumes a large amount of time. The standard time synchronization system is not applicable in the vehicle field, and the time synchronization system constructed in the vehicle field may not achieve the standard time synchronization system, so that different time synchronization systems require to be constructed in different application scenarios, which easily results in a resource waste.

In view of the above technical problems, a method for time synchronization is provided according to embodiments of the disclosure. Target information including preset mode information is acquired, a target mode is determined according to the preset mode information, a first synchronous clock as a clock source is determined in the target mode, and a device waiting for the time synchronization performs the time synchronization according to the first synchronous clock, that is, different time synchronization manners are adopted according to different preset modes, which may perform the time synchronization rapidly and accurately and have a rapid processing speed. One preset mode supports an execution of the standard time synchronization manner, and the other preset mode supports an execution of the time synchronization manner in the vehicle field, so that one method for time synchronization is applicable to various application scenarios, which supports the standard time synchronization system and is compatible with the time synchronization system in the vehicle field, and the processing speed is high, the processing efficiency is high, and a large amount of time does not need to be consumed. In detail, a method for time synchronization according to embodiments of the disclosure is described below.

Figure 1:
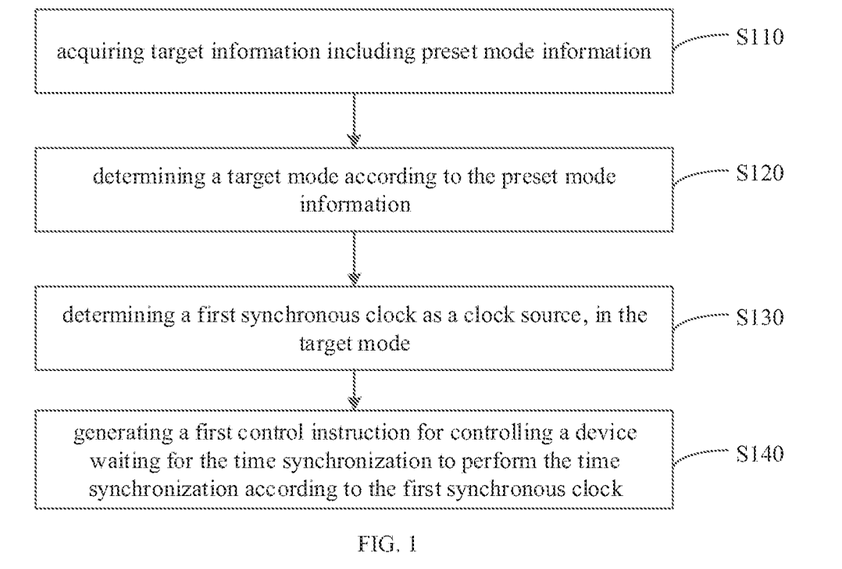
FIG. 1 is a flowchart illustrating a method for time synchronization according to embodiments of the disclosure.

FIG. 1 is a flowchart illustrating a method for time synchronization according to embodiments of the disclosure. The method for time synchronization is applicable to a plurality of devices waiting for the time synchronization and includes steps S110 to S140 in FIG. 1.

At S110, target information including preset mode information is acquired.

It may be understood that, a processor mounted on a vehicle or on other terminals acquires the target information. The target information includes the preset mode information. The target information may be information generated in advance when the vehicle is configured by the processor or information from other terminals to the processor. The preset mode information is preset information that may be directly acquired by the processor.

At S120, a target mode is determined according to the preset mode information.

It may be understood that, on the basis of the above S110, after the target information is acquired, the target mode is determined according to the preset mode information in the target information. The target mode is one of a plurality of preset modes, that is, a mode that a device waiting for time synchronization performs time synchronization.

According to some embodiments, the preset mode includes a first mode and a second mode.

It may be understood that, it is determined whether the target mode is the first mode or the second mode according to the preset mode information. The first mode may be understood as a preset message mode, which may implement the above standard time synchronization system. The message may be preconfigured, which may reduce a period of time for waiting for the messages, and further reduce a period of time for time synchronization. The second mode may be understood as a preset role mode. In the preset role mode, a plurality of terminal devices in the vehicle may be configured as a masters or a slave in advance, respectively, so it is applicable to the vehicle field. The time of the master is generally taken as a master clock, and step of determining an optimal clock is not needed, which further reduces the period of time for the time synchronization. In the above two modes, the period of time for the time synchronization may be reduced from more than 2 seconds to within 100 milliseconds, which greatly reduces the period of time required by the device to perform the time synchronization.

Figure 2:
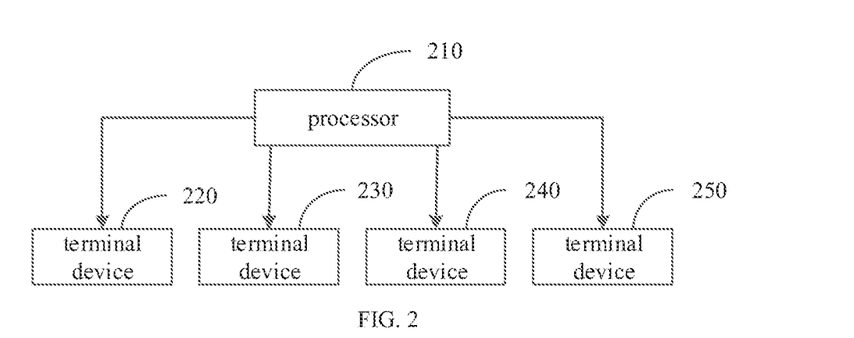
FIG. 2 is a diagram illustrating a structure of time synchronization according to embodiments of the disclosure.

According to some embodiments, referring to FIG. 2, FIG. 2 is a diagram illustrating a structure of time synchronization according to embodiments of the disclosure, and includes a processor 210, a terminal device 220, a terminal device 230, a terminal device 240, and a terminal device 250. The processor 210 is connected to a plurality of terminal devices, and the plurality of terminal devices include a device waiting for time synchronization. The following description of the device waiting for time synchronization may be expressed in terms of the terminal device. The processor 210 acquires the target information, and determines the target mode according to the preset mode information in the target information. Based on the target mode being the second mode, that is, the preset role mode, configuration information of each of the plurality of devices in the preset mode information may be acquired. For example, it is determined that the terminal device 220 is configured as the master from the configuration information, and the terminal device 230, the terminal device 240, and the terminal device 250 are configured as the slaves, so that the time of the terminal device 220 is taken as the clock source (the master clock), and the terminal device 230, the terminal device 240, and the terminal device 250 perform the time synchronization according to the clock source of the terminal device 220. It may be understood that, in the second mode, the plurality of terminal devices connected to the processor 210 include the terminal device 220 of the master and the terminal devices 230 to 250 of the slave.

At S130, a first synchronous clock as a clock source is determined in the target mode.

It may be understood that, on the basis of the above S120, the first synchronous clock as the clock source is determined in the target mode. The first synchronous clock is determined using different manners in the first mode and the second mode respectively. The first synchronous clock may be understood as the master clock. Other terminal devices connected to the processor may perform the time synchronization according to the first synchronous clock.

At S140, a first control instruction for controlling a device waiting for the time synchronization to perform the time synchronization according to the first synchronous clock.

It may be understood that, on the basis of the S130, the processor generates the first control instruction including the first synchronous clock, and transmits the first control instruction to the plurality of devices waiting for the time synchronization (terminal devices). The first control instruction is configured to control the device waiting for the time synchronization to perform the time synchronization according to the first synchronous clock.

According to some embodiments, referring to FIG. 2, after determining that the time of the terminal device 220 is the first synchronous clock as the clock source at S130, the processor 210 transmits the first control instruction to the terminal device 230, the terminal device 240, and the terminal device 250. The first control instruction is configured to control the terminal device 230, the terminal device 240, and the terminal device 250 to perform the time synchronization according to the first synchronous clock.

According to the method for time synchronization according to embodiments of the disclosure, the target information including the preset mode information is acquired, the target mode for time synchronization is determined according to the preset mode information, the first synchronous clock as the clock source is determined in the target mode, and the first control instruction including the first synchronous clock is generated. The first synchronous clock is configured to control the device waiting for the time synchronization to perform the time synchronization according to the first synchronous clock. That is, the time synchronization is performed according to the manner corresponding to the target mode. Different target modes are applicable to different application scenarios, and no step of waiting is required, so that it may perform the time synchronization rapidly and accurately, a large amount of time does not need to be consumed, and it may have high processing efficiency.

Figure 3:
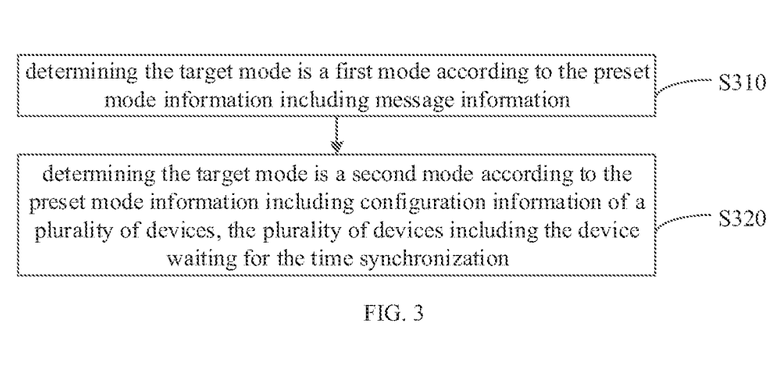
FIG. 3 is a flowchart illustrating a method for time synchronization according to embodiments of the disclosure.

On the basis of the above embodiments, FIG. 3 is a flowchart illustrating a method for time synchronization according to embodiments of the disclosure. According to some embodiments, the target mode is determined according to the preset mode information. Steps S310 to S320 as shown in FIG. 3 are included.

At S310, it is determined that the target mode is a first mode according to the preset mode information including message information.

It may be understood that, it is analyzed whether the preset mode information includes the message information. Based on the acquired preset mode information including message information corresponding to each of the plurality of terminal devices, it is determined that the target mode is the first mode, and the first mode includes preconfiguring the message information corresponding to each of the plurality of terminal devices, which may reduce a period of time for waiting for the terminal device to transmit the message, and the terminal device may be configured to transmit the message to the processor actively and periodically, and the transmission period is short. The message information includes time information of each of the plurality of terminal devices waiting for the time synchronization.

According to some embodiments, after determining the target mode, determining the first synchronous clock as the clock source in the target mode includes: acquiring the message information in the preset mode information in the first mode; and determining the first synchronous clock as the clock source by means of a master clock algorithm, according to the message information.

It may be understood that, in the first mode, that is, in the preset message mode, the message information in the preset mode information is acquired, and in a time synchronization process, the processor may directly acquire the message information in the preset mode information, without waiting for the terminal device to generate and transmit the message. After the message information is acquired, the first synchronous clock as the clock source may be determined by means of the master clock algorithm, according to a plurality of pieces of message information corresponding to the plurality of terminal devices. The master clock algorithm may be the above best master clock algorithm. The best master clock algorithm is obtaining accurate time according to message information including time information corresponding to each of the plurality of terminal devices, and taking the time as the first synchronous clock. The master clock algorithm may be other algorithms for determining the clock source, which will not be limited herein.

It may be understood that, after the first synchronous clock as the clock source is determined by means of the master clock algorithm in the first mode, all terminal devices connected to the processor perform the time synchronization according to the first synchronous clock. In other embodiments, based on there is the terminal device having the time which is the same as the time of the first synchronous clock as the clock source determined by means of the master clock algorithm among all terminal devices connected to the processor, this terminal device with the same time may not perform the time synchronization, and other terminal device than this terminal device needs to perform the time synchronization according to the first synchronous clock.

At S320, it is determined that the target mode is a second mode according to the preset mode information including configuration information of a plurality of devices. The plurality of devices include the device waiting for the time synchronization.

It may be understood that, when the preset mode information includes the configuration information of the plurality of devices, it is determined that the target mode is the second mode, that is, the target mode is the preset role mode. The preset role mode preferentially configures whether the terminal device is a master or a slave, and is widely applicable to the vehicle field. After the master and the slave are determined, it is determined that the time of the master is the first synchronous clock as the clock source in the second mode. The plurality of devices may refer to the plurality of terminal devices, and include the device waiting for the time synchronization and the master, that is, the plurality of devices include a device for time synchronization (the slave) and a device for providing a clock source (the master).

According to some embodiments, after determining the target mode is the second mode, determining the first synchronous clock as the clock source in the second mode further includes: acquiring the configuration information of the plurality of devices in the second mode; determining the master in the plurality of devices according to the configuration information; and determining time of the master as the first synchronous clock.

It may be understood that, in the second mode, that is, in the preset role mode, the configuration information of the plurality of devices in the preset mode information is acquired. The configuration information indicates whether each of the plurality of devices is the master or the slave. The preset configuration information may be preconfigured when the vehicle is manufactured. The processor may directly acquire the preset configuration information, and subsequently acquire the time of the terminal device configured as the master according to the preset configuration information, and take the time as the first synchronous clock. In the second mode, it's not necessary to wait for each of the terminal devices to transmit the message or determine the master clock according to the message, which greatly reduces the period of time for time synchronization.

It may be understood that, when the first synchronous clock as the clock source is determined, the terminal device for generating the first synchronous clock is the master, that is, the terminal device for generating the clock source is the master, and other terminal devices needing to perform the time synchronization according to the first synchronous clock is the slave.

According to the method for time synchronization according to embodiments of the disclosure, it is determined whether the target mode is the first mode or the second mode according to the preset mode information, and the first synchronous clock as the clock source is determined in different target modes. The method according to the disclosure supports a plurality of preset modes, which may accurately acquire the first synchronous clock as the clock source in different modes, may accelerate the time synchronization process, reduce the time consumption. and facilitate the terminal device to perform the time synchronization according to the first synchronous clock.

Figure 4:
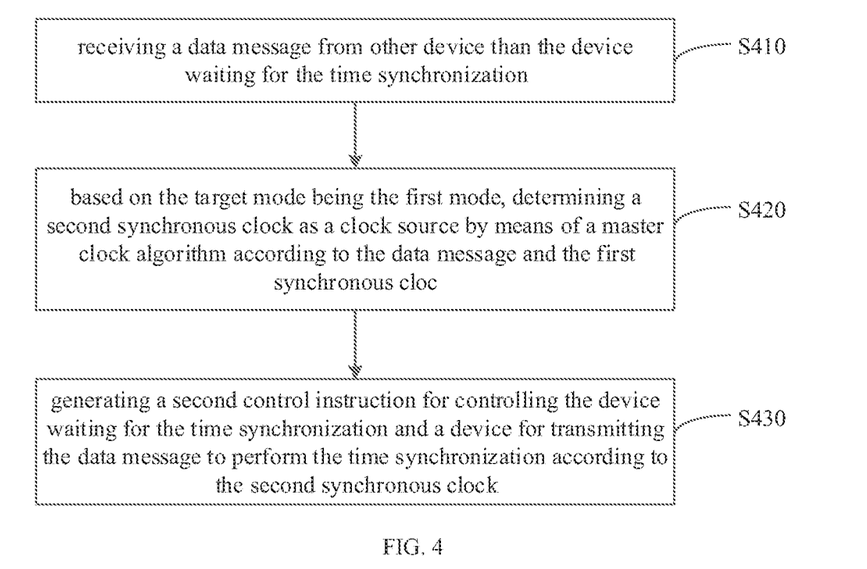
FIG. 4 is a flowchart illustrating a method for time synchronization according to embodiments of the disclosure.

On the basis of the above embodiments, in the time synchronization process of the plurality of terminal devices, when other new terminal device(s) is added, and the new terminal device needs to perform the time synchronization, following steps S410 to S430 in FIG. 4 are included.

At S410, a data message from other device than the device waiting for the time synchronization is received.

It may be understood that, the processor receives the data message transmitted by other device than the device waiting for the time synchronization. The data message is transmitted by a new terminal device needing to perform the time synchronization, and generated by the new terminal device, rather than preconfigured in the first mode. The form of the above message information may be same as the form of the data message, and the data message may include time information of the new terminal device.

At S420, based on the target mode being the first mode, a second synchronous clock as a clock source is determined by means of a master clock algorithm according to the data message and the first synchronous clock.

It may be understood that, on the basis of the above S410, based on the target mode being the first mode, that is, based on the preset mode being the preset message mode, the second synchronous clock as the clock source is determined by means of the master clock algorithm according to the data message from the new terminal device, that is, it is determined whether the new terminal device is a device for providing the clock source or a device needing to perform the time synchronization.

At S430, a second control instruction for controlling the device waiting for the time synchronization and a device for transmitting the data message to perform the time synchronization according to the second synchronous clock is generated.

It may be understood that, on the basis of the above S420, after determining the second synchronous clock, the processor generates the second control instruction including the second synchronous clock, and transmits the second control instruction to the device waiting for the time synchronization and the device for transmitting the data message. The second control instruction is configured to control the device waiting for the time synchronization and the device for transmitting the data message to perform the time synchronization according to the second synchronous clock. That is, after the new terminal device is added, the second synchronous clock as the clock course needs to be determined according to the time of the new terminal device, that is, the master clock is re-determined, and the second control instruction including the master clock is generated.

According to some embodiments, on the basis of the above S410, based on the target mode being the second mode, under a case that the device for transmitting the data message has been configured as the master, time of the device for transmitting the data message is acquired, and the time is determined as the second synchronous clock; and a second control instruction for controlling the device waiting for the time synchronization to perform the time synchronization according to the second synchronous clock is generated.

It may be understood that, based on the target mode being the second mode, that is, based on the target mode being the preset role mode, the processor acquires configuration information of the device for transmitting the data message, and determines whether the device for transmitting the data message is configured as the master, that is, determines whether the device for transmitting the data message (the new terminal device) is a device for providing a clock source; based on the device for transmitting the data message being configured as the master, acquires the time of the device for transmitting the data message and takes the time as the second synchronous clock, that is, the second synchronous clock is determined by the device for transmitting the data message; and generates the second control instruction including the second synchronous clock, and transmits the second control instruction to the device waiting for the time synchronization. Since the time of the second synchronous clock is same as the time of the device for transmitting the data message, the device for transmitting the data message does not need to perform the time synchronization, and it only needs to perform the time synchronization on a plurality of devices waiting for the time synchronization, in which the master for providing the first synchronous clock is the device waiting for the time synchronization.

According to some embodiments, based on the device for transmitting the data message not being configured as the master, the first synchronous clock is taken as a second synchronous clock; and a second control instruction for controlling the device for transmitting the data message according to the second synchronous clock is generated.

It may be understood that, based on the device for transmitting the data message not being configured as the master, the first synchronous clock is taken as the second synchronous clock, and the second synchronous clock may be the current time of the device for providing the first synchronous clock (the master) in the plurality of devices. The first synchronous clock varies with the time of the master at any time. The time of the first synchronous clock at this time is different from the time of the first synchronous clock when the device waiting for the time synchronization performs the time synchronization, and is an updated first synchronous clock. After the second synchronous clock as the clock source is determined, the second control instruction including the second synchronous clock is generated, and the second control instruction is transmitted to the device for transmitting the data message (the new device). The second control instruction is configured to control the device for transmitting the data message to perform the time synchronization according to the second synchronous clock, in which the time of the device waiting for the time synchronization is same as the time of the master, and the time synchronization may not be performed.

It may be understood that, after all terminal devices including the plurality of terminal devices and the new device complete the time synchronization, time errors of the terminal devices may be calculated using an existing manner, and the terminal devices adjust the time themselves to maintain accuracy of time after the terminal devices perform the time synchronization, so that the time of the terminal devices is in a synchronous maintenance stage. The synchronous maintenance stage refers to a stage in which the time of the terminal devices needs to maintain synchronization, which be achieved by a controller in the synchronous maintenance stage. Parameters of the controller may be set according to actual requirements, and the implementation of the synchronous maintenance stage may refer to the manner in which the device adjusts the time itself in the related art, which will not be repeated herein.

According to the method for time synchronization according to embodiments of the disclosure, the data message from other device than the device waiting for the time synchronization is received; based on the target mode being the first mode, the second synchronous clock as the clock source is determined by means of the master clock algorithm according to the data message and the first synchronous clock; the second control instruction is generated, and transmitted to the device waiting for the time synchronization and the device for transmitting the data message, so that all terminal devices perform the time synchronization according to the second synchronous clock. The new device may be added in the time synchronization process, and in different preset modes, the second synchronous clock may be determined rapidly and accurately according to the data message of the new device in different preset modes, and the time synchronization is performed on the terminal device at any time, which has good flexibility and a rapid processing speed.

Figure 5:
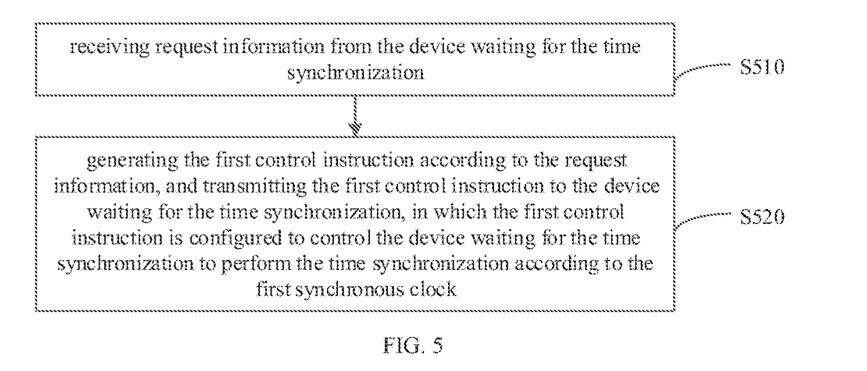
FIG. 5 is a flowchart illustrating a method for time synchronization according to embodiments of the disclosure.

On the basis of the above embodiments, FIG. 5 is a flowchart illustrating a method for time synchronization according to embodiments of the disclosure. According to some embodiments, a first control instruction for controlling a device waiting for the time synchronization to perform the time synchronization according to the first synchronous clock is generated. Steps S510 to S520 in FIG. 5 are included.

At S510, request information from the device waiting for the time synchronization is received.

It may be understood that, in different target modes, after determining the first synchronous clock as the clock source, the processor may receive the request information from the terminal device. The request information refers to information that the terminal device requests to perform the time synchronization. The request information is actively transmitted by each of the plurality of terminal devices, that is, the terminal device actively requests to perform the time synchronization, which may be referred to as an active synchronous mechanism. However, the manner for time synchronization in the related art needs to wait for the time synchronization, that is, the terminal device or the processor serving as the master needs to transmit a control instruction to the terminal device serving as the slave, and the terminal device serving as the slave needs to wait for the terminal device or the processor serving as the master to transmit the control instruction and performs the time synchronization after receiving the control instruction, which may be referred to as a passive synchronous mechanism. That is, for the terminal device as the slave, the method for time synchronization according to the disclosure converts the terminal device passively performing the time synchronization (the passive synchronous mechanism) into the terminal device actively requesting to perform the time synchronization (the active synchronization mechanism), without needing to wait for the period of time, and the time synchronization process may be accelerated.

It may be understood that, after receiving the request information from the devices waiting for the time synchronization, the processor further needs to determine which device waiting for the time synchronization, transmits the request information, that is, determines which terminal device transmits the request information or which terminal device actively requests to perform the time synchronization.

At S520, the first control instruction is generated according to the request information, and the first control instruction is transmitted to the device waiting for the time synchronization. The first control instruction is configured to control the device waiting for the time synchronization to perform the time synchronization according to the first synchronous clock.

It may be understood that, on the basis of the S510, after the request information is received, and the device for transmitting the request information is determined, the control instruction including the first synchronous clock is generated, and transmitted to the terminal device for transmitting the request information, so that the terminal device performs the time synchronization according to the first synchronous clock.

According to some embodiments, referring to FIG. 2, after the terminal device 220 is determined as the master, the terminal device 230 transmits the request information, and the processor receives the request information from the terminal device 230, and generates the first control information, and returns the first control information to the terminal device 230, and the terminal device 230 performs the time synchronization according to the first control instruction. A sequence in which the terminal devices transmit the request information is not limited. The request information may be transmitted to the processor in sequence or may be transmitted to the processor together.

According to some embodiments, after the processor transmits the first control instruction to the terminal device, an updated first control instruction is periodically transmitted to the device waiting for the time synchronization, under a case that the response information generated by the device waiting for the time synchronization (the terminal device for transmitting the request information) according to the first control instruction is not received within a preset period of time.

It may be understood that, after the terminal device transmits the request information, the processor may determine whether the terminal device receives the first control instruction within the preset period of time, that is, the terminal may generate the response information after receiving the first control instruction, and return the response information to the processor, and the processor determines whether the terminal device receives the first control instruction based on whether to receive the response information. The processor may periodically transmit the updated first control instruction to the terminal device when the processor does not receive the response information. The preset period of time may be a time duration within the range of one thousandth to one tenth of the time corresponding to the passive synchronous mechanism. The updated first control instruction is the current time of the terminal device providing the first synchronous clock serving as the clock source. When the terminal device as the slave does not receive the first control instruction, the processor may not generate the first control instruction after receiving the request information or the terminal device as the slave does not receive the first control instruction in other cases, so that the terminal device as the slave may not perform the time synchronization according to the first control instruction. Therefore, the terminal device as the master may directly and periodically transmit the updated first control instruction to the terminal device that does not receive the first control instruction, or the processor periodically transmits the updated first control instruction to the terminal device that does not the first control instruction, and the terminal device as the slave receives the first control instruction and performs the time synchronization according to the first synchronous clock in the first control instruction. Periodically transmitting the updated first control instruction corresponds to step of waiting for the time synchronization in the standard time synchronization method, that is, the terminal device as the slave passively receives the control instruction to perform the time synchronization, that is, the passive synchronous mechanism. When the active synchronous mechanism of the terminal device as the slave does not take effect, the passive synchronous mechanism of the terminal device as the slave is selected, to ensure that all terminal devices as the slaves may complete the time synchronization in an emergency condition, which ensures implementability. The manner for converting from the active synchronous mechanism to the passive synchronous mechanism may be referred to as a timeout mechanism. The timeout mechanism refers to a mechanism initiated by receiving the response message within the preset period of time.

According to the method for time synchronization according to embodiments of the disclosure, the request information from the device waiting for the time synchronization is received, and the certain terminal device for transmitting the request information is determined. The first control instruction is generated according to the request information, and the first control instruction is transmitted to the determined terminal device. The terminal device performs the time synchronization according to the first synchronous clock using a mechanism that the slave actively transmits the request information to perform the time synchronization, and the slave does not need to wait for the processor to transmit the first control instruction. The processor may transmit the first control instruction to the terminal device for transmitting the request information after receiving the request information, which may accelerate the time synchronization process and reduces the time consumption.

Figure 6:
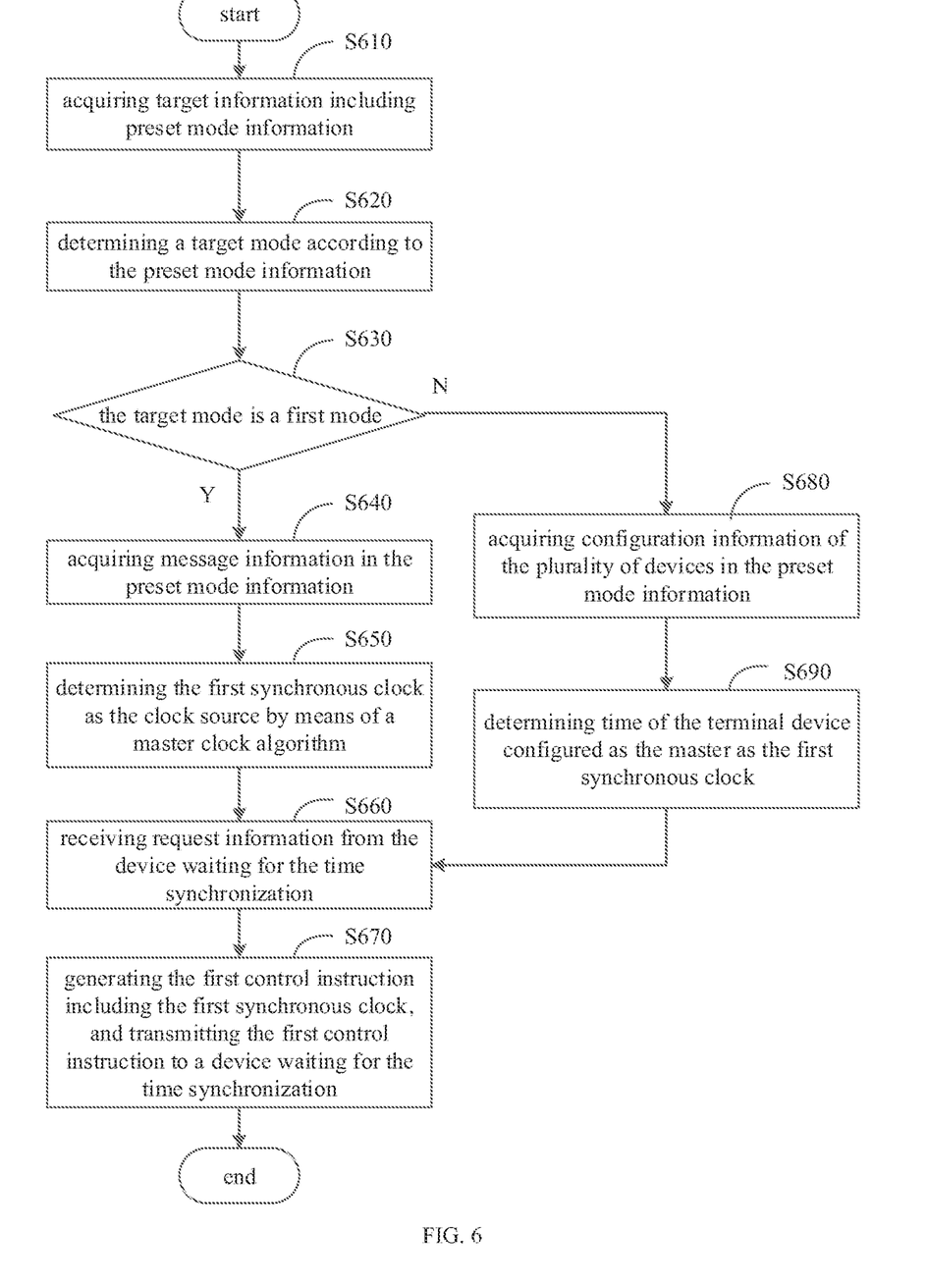
FIG. 6 is a flowchart illustrating a method for time synchronization according to embodiments of the disclosure.

On the basis of the above embodiments, FIG. 6 is a flowchart illustrating a method for time synchronization according to embodiments of the disclosure. According to some embodiments, steps S610 to S690 in FIG. 6 are included.

At S610, target information including preset mode information is acquired.

It may be understood that, before the target information is acquired, steps of powering on the processor and the terminal device are required. After the processor is powered on, the target information including the preset mode information is acquired.

At S620, a target mode is determined according to the preset mode information.

It may be understood that, on the basis of the above S610, a specific target mode is determined according to the preset mode information. The target mode is one of a plurality of preset modes.

At S630, it is determined whether the target mode is a first mode.

It may be understood that, on the basis of the above S620, after the target mode is determined, it is determined whether the target mode is the first mode or the second mode, that is, it is determined whether the preset mode is a preset message mode or a preset role mode. In the first mode, S640 is performed; and in the second mode, S680 is performed.

At S640, message information in the preset mode information is acquired.

It may be understood that, on the basis of the above S630, based on the target mode being the first mode (the preset message mode), preset message information corresponding to the terminal devices is directly acquired, and the preset message information includes time information of the terminal devices.

At S650, the first synchronous clock as the clock source is determined by means of a master clock algorithm.

It may be understood that, on the basis of the above S640, the first synchronous clock as the clock source is determined by means of the master clock algorithm according to the message information, that is, it is determined whether the time of the terminal devices is accurate by means of the master clock algorithm, and the determined accurate time is taken as the first synchronous clock, that is, the terminal device with the accurate time is taken as the master, and other terminal device(s) needing to perform the time synchronization is the slave.

At S660, request information from the device waiting for the time synchronization is received.

It may be understood that, on the basis of the above S650, the processor receives the request information from the terminal device, and determines a specific terminal device for transmitting the request information, that is, determines which terminal device transmits the request information. The request information refers to information that the terminal device requests to perform the time synchronization.

It may be understood that, the terminal device actively transmits the request information to the processor. The manner for requesting to perform the time synchronization may be referred to as the active synchronous mechanism that the terminal device does not need to wait for the processor to periodically transmit the first control instruction, and the processor may directly transmit the first control instruction generated to the terminal device for transmitting the request information after receiving the request information.

It may be understood that, the standard time synchronization method is supported in the first mode to perform the time synchronization.

At S670, the first control instruction including the first synchronous clock is generated, and transmitted to a device waiting for the time synchronization.

It may be understood that, on the basis of the S660, the processor generates the first control instruction including the first synchronous clock according to the request information after receiving the request information, and transmits the first control instruction to the device waiting for the time synchronization. The first control instruction is configured to control the device waiting for the time synchronization to perform the time synchronization according to the first synchronous time.

At S680, configuration information of the plurality of devices in the preset mode information is acquired.

It may be understood that, on the basis of the above S630, based on the target mode being the second mode, in the second mode, that is, in the preset role mode, configuration information of the plurality of devices in the preset mode information is acquired, and it may be determined whether the terminal device is the master or the slave according to the configuration information.

At S690, time of the terminal device configured as the master is determined as the first synchronous clock.

It may be understood that, on the basis of the above S690, the master in the plurality of devices is determined according to the configuration information, and the time of the terminal device configured as the master is acquired, and taken as the first synchronous clock, and subsequently, S660 is performed.

It may be understood that, the second mode supports performing the time synchronization in the vehicle field or on other devices not supporting the best clock algorithm. The method for time synchronization according to embodiments of the disclosure is compatible with the standard time synchronization method and the time synchronization method in the vehicle field.

Figure 7:
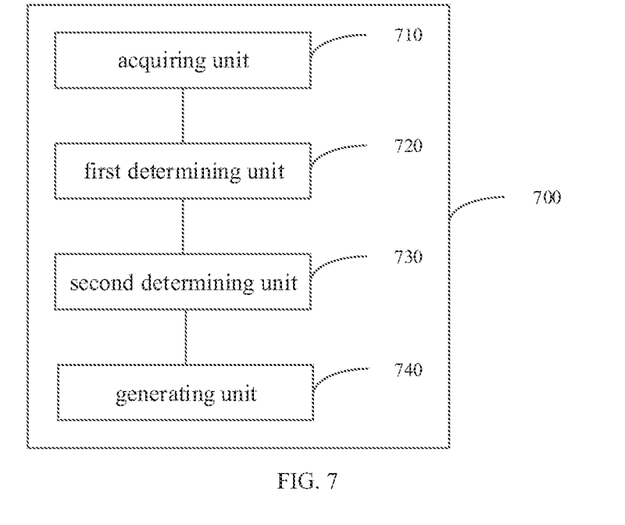
FIG. 7 is a diagram illustrating an apparatus for time synchronization according to embodiments of the disclosure.

FIG. 7 is a diagram illustrating an apparatus for time synchronization according to embodiments of the disclosure. The apparatus for time synchronization according to embodiments of the disclosure may execute a processing flow provided in method embodiments for time synchronization. As shown in FIG. 7, the apparatus 700 for time synchronization includes an acquiring unit 710, a first determining unit 720, a second determining unit 730, and a generating unit 740.

The acquiring unit 710 is configured to acquire target information including preset mode information.

The first determining unit 720 is configured to determine a target mode according to the preset mode information.

The second determining unit 730 is configured to determine a first synchronous clock as a clock source in the target mode.

The generating unit 740 is configured to generate a first control instruction for controlling a device waiting for the time synchronization to perform the time synchronization according to the first synchronous clock.

According to some embodiments, there are a plurality of devices waiting for time synchronization in the generating unit 740.

According to some embodiments, the first determining unit 720 determines a target mode according to the preset mode information, and is specifically configured to: determine that the target mode is a first mode according to the preset mode information including message information; or determine that the target mode is a second mode according to the preset mode information including configuration information of the plurality of devices. The plurality of devices include the device waiting for the time synchronization.

According to some embodiments, the second determining unit 730 determines the first synchronous clock as the clock source in the target mode, and is specifically configured to: acquire the message information in the preset mode information in the first mode; and determine the first synchronous clock as the clock source by means of a master clock algorithm, according to the message information.

According to some embodiments, the plurality of devices in the second determining module 730 further include a master.

According to some embodiments, the second determining unit 730 determines the first synchronous clock as the clock source in the target mode, and is specifically configured to: acquire the configuration information of the plurality of devices in the second mode; determine the master in the plurality of devices according to the configuration information; and determine time of the master as the first synchronous clock.

According to some embodiments, the apparatus 700 further includes a new unit. The new unit is specifically configured to: receive a data message from other device than the device waiting for the time synchronization; based on the target mode being the first mode, determine a second synchronous clock as a clock source by means of a master clock algorithm according to the data message and the first synchronous clock; and generate a second control instruction for controlling the device waiting for the time synchronization and a device for transmitting the data message to perform the time synchronization according to the second synchronous clock.

According to some embodiments, the new unit is further configured to: based on the target mode being the second mode, under a case that the device for transmitting the data message has been configured as the master, acquire the time of the device for transmitting the data message, and determining the time as the second synchronous clock; and generate a second control instruction for controlling the device waiting for the time synchronization to perform the time synchronization according to the second synchronous clock.

According to some embodiments, the new unit is further configured to: based on the device for transmitting the data message not being configured as the master, take the first synchronous clock as a second synchronous clock; and generate a second control instruction for controlling the device for transmitting the data message according to the second synchronous clock.

According to some embodiments, the generating unit 740 generates a first control instruction for controlling a device waiting for the time synchronization to perform the time synchronization according to the first synchronous clock, and is specifically configured to: receive request information from the device waiting for the time synchronization; and generate the first control instruction according to the request information, and transmit the first control instruction to the device waiting for the time synchronization. The first control instruction is configured to control the device waiting for the time synchronization to perform the time synchronization according to the first synchronous clock.

According to some embodiments, the generating unit 740 is further configured to periodically transmit an updated first control instruction to the device waiting for the time synchronization in a case that response information generated by the device waiting for the time synchronization according to the first control instruction is not received within a preset period of time.

The apparatus for time synchronization in embodiments of FIG. 7 is applicable to the technical solutions of method embodiments for time synchronization, and the implementation principle and the technical effect are similar, which will not be repeated herein.

Figure 8:
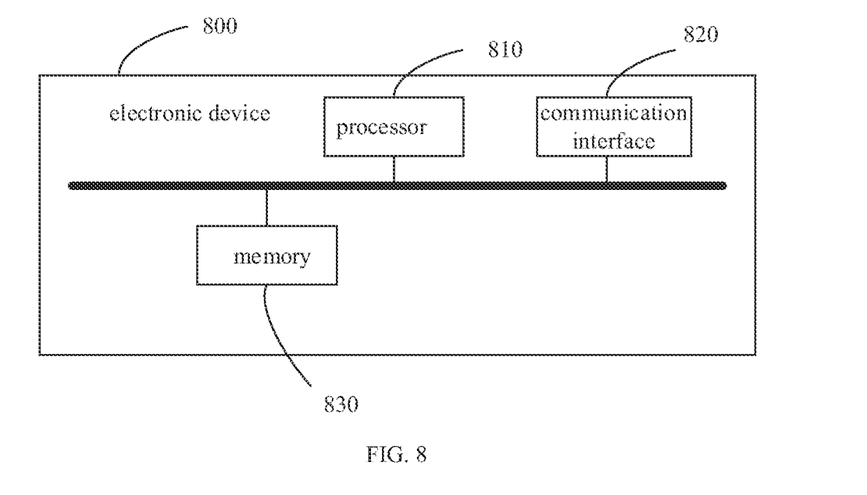
FIG. 8 is a diagram illustrating an electronic device according to embodiments of the disclosure.

FIG. 8 is a diagram illustrating an electronic device according to embodiments of the disclosure. The electronic device according to embodiments of the disclosure may execute the processing flow according to the above embodiments. As shown in FIG. 8, the device electronic 800 includes a processor 810, a communication interface 820, and a memory 830. The computer program is stored in the memory 830 and is configured to perform the method for time synchronization when executed by the processor 810.

In addition, a computer-readable storage medium with a computer program stored thereon is further provided according to embodiments of the disclosure. The computer program is executed by a processor to perform the method for time synchronization in the above embodiments.

In addition, a computer program product is further provided according to embodiments of the disclosure. The computer program product includes a computer program or an instruction. The computer program or the instruction is configured to perform the method for time synchronization provided according to the above embodiments when executed by a processor.

In addition, a computer program including a computer program code is provided according to embodiments of the disclosure. When the computer program code runs on a computer, the computer performs the method for time synchronization provided according to the any embodiments.

It should be noted that relational terms such as "first" and "second" are used herein to distinguish one entity or operation from another entity or operation without necessarily requiring or implying any such actual relationship or order between such entities or operations. And, the terms "comprise", "comprising" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or apparatus that includes the elements.

The foregoing is merely a specific embodiment of the disclosure, so that those skilled in the art may understand or implement the disclosure. Various modifications to the embodiments will be apparent to those skilled in the art, and general principles defined herein may be implemented in other embodiments without departing from the spirit or scope of the disclosure. Therefore, the disclosure may not be limited to the embodiments described herein, but conform to the widest scope consistent with principles and novel features disclosed herein.

All embodiments of the disclosure may be executed separately or in combination with other embodiments, and are deemed within a protection scope of the disclosure.

What is claimed is:

1. A method for time synchronization performed by a processor in a vehicle, comprising:
    acquiring target information comprising preset mode information;
    determining a target mode according to the preset mode information, wherein determining the target mode according to the preset mode information includes;
        determining that the target mode is a first mode in a case that the preset mode information comprises message information; or
        determining that the target mode is a second mode in a case that the preset mode information comprises configuration information of a plurality of devices in the vehicle, the plurality of devices including the device waiting for the time synchronization;
    determining a first synchronous clock as a clock source in the target mode;
    receiving request information from a device waiting for the time synchronization among a plurality of devices in the vehicle;
    generating a first control instruction for controlling the device waiting for the time synchronization based on the request information, and transmitting the first control instruction to the device waiting for the time synchronization, to perform the time synchronization according to the first synchronous clock;
    receiving a data message from a second device of said plurality of devices other than the device waiting for the time synchronization;
    based on the target mode being the first mode, determining a second synchronous clock as a clock source by means of a master clock algorithm according to the data message and the first synchronous clock and generating a second control instruction for controlling the device waiting for the time synchronization and the second device, to perform the time synchronization according to the second synchronous clock; and
    based on the target mode being the second mode, in a case that the second device has been configured as a master device, acquiring time of the second device, and determining the time of the second device as the second synchronous clock, and generating the second control instruction for controlling the device waiting for the time synchronization to perform the time synchronization according to the second synchronous clock.

2. The method according to claim 1, wherein the step of determining a first synchronous clock as the clock source in the target mode comprises:
    acquiring the message information in the preset mode information in the first mode; and
    determining the first synchronous clock as the clock source by means of a master clock algorithm, according to the message information.

3. The method according to claim 1, wherein the plurality of devices further includes a master device, and the step of determining a first synchronous clock as the clock source in the target mode comprises:
    acquiring the configuration information of the plurality of devices in the preset information in the second mode;
    determining the master device in the plurality of devices according to the configuration information; and
    determining time of the master device as the first synchronous clock.

4. The method according to claim 1, further comprising:
    based on the target mode being the second mode, in a case that the second device has not been configured as the master device, taking the first synchronous clock as the second synchronous clock; and
    generating the second control instruction for controlling the second device according to the second synchronous clock.

5. The method according to claim 1, wherein the first control instruction is configured to control the device waiting for the time synchronization to perform the time synchronization according to the first synchronous clock.

6. The method according to claim 5, further comprising:
    periodically transmitting an updated first control instruction to the device waiting for the time synchronization in a case that response information generated by the second device according to the first control instruction is not received within a preset period of time.

7. An electronic device, comprising:
    a memory;
    a processor; and
    a computer program stored in the memory,
    wherein the computer program is configured to be executed by the processor to perform:
    acquiring target information comprising preset mode information;

determining a target mode according to the preset mode information, wherein determining the target mode according to the preset mode information includes;
    determining that the target mode is a first mode in a case that the preset mode information comprises message information; or
    determining that the target mode is a second mode in a case that the preset mode information comprises configuration information of a plurality of devices in a vehicle, the plurality of devices including the device waiting for the time synchronization;
determining a first synchronous clock as a clock source, in the target mode;
receiving request information from a device waiting for the time synchronization among the plurality of devices in the vehicle;
generating a first control instruction for controlling the device waiting for the time synchronization based on the request information, and transmitting the first control instruction to the device waiting for the time synchronization, to perform the time synchronization according to the first synchronous clock;
receiving a data message from a second device of said plurality of devices other than the device waiting for the time synchronization;
based on the target mode being the first mode, determining a second synchronous clock as a clock source by means of a master clock algorithm according to the data message and the first synchronous clock and generating a second control instruction for controlling the device waiting for the time synchronization and the second device, to perform the time synchronization according to the second synchronous clock; and
based on the target mode being the second mode, in a case that the second device has been configured as a master device, acquiring time of the second device, and determining the time of the second device as the second synchronous clock, and generating the second control instruction for controlling the device waiting for the time synchronization to perform the time synchronization according to the second synchronous clock.

8. A non-transitory computer-readable storage medium with a computer program stored thereon, wherein the computer program is configured to perform steps of a method for time synchronization when executed by a processor, the method comprising:

acquiring target information comprising preset mode information;
determining a target mode according to the preset mode information, wherein determining the target mode according to the preset mode information includes;
    determining that the target mode is a first mode in a case that the preset mode information comprises message information; or
    determining that the target mode is a second mode in a case that the preset mode information comprises configuration information of a plurality of devices in a vehicle, the plurality of devices including the device waiting for the time synchronization;
determining a first synchronous clock as a clock source, in the target mode;
receiving request information from a device waiting for the time synchronization among the plurality of devices in the vehicle;
generating a first control instruction for controlling the device waiting for the time synchronization based on the request information, and transmitting the first control instruction to the device waiting for the time synchronization, to perform the time synchronization according to the first synchronous clock;
receiving a data message from a second device of said plurality of devices other than the device waiting for the time synchronization;
based on the target mode being the first mode, determining a second synchronous clock as a clock source by means of a master clock algorithm according to the data message and the first synchronous clock and generating a second control instruction for controlling the device waiting for the time synchronization and the second device, to perform the time synchronization according to the second synchronous clock; and
based on the target mode being the second mode, in a case that the second device has been configured as a master device, acquiring time of the second device, and determining the time of the second device as the second synchronous clock, and generating the second control instruction for controlling the device waiting for the time synchronization to perform the time synchronization according to the second synchronous clock.

\* \* \* \* \*